3,321,828
ALUMINUM BRAZING
Clarence John Miller, Paoli, Pa., assignor to General Electric Company, a corporation of New York
No Drawing. Filed Jan. 2, 1962, Ser. No. 163,922
2 Claims. (Cl. 29—488)

This invention pertains to the brazing of metals, and particularly of aluminum and its alloys.

In most brazing operations, it is necessary to use, in addition to the fusible metal employed to form the joint proper, some flux to remove the coating of oxide which is usually present on the faces to be joined and which, even if not initially present, will usually be formed at the temperature of brazing if the faces to be joined are accessible to the air. Fluxes ordinarily employed dissolve such oxides, or etch the metal slightly to release the oxide from the surface of the metal, or both. Preferably, also, at brazing temperature they form a fluid air-excluding coating over the joint faces until displaced by the molten solder as it wets the faces, so that the solder comes in contact with an oxide-free face. The use of fluxes is sometimes undesirable because many of them are corrosive, and there is always a residue of flux left after the brazing operation which is expensive to remove, and sometimes difficult or (in closed structures) impossible to eliminate.

Aluminum, because of its extreme susceptibility to oxidation, and because of the tenacity of its oxide, is sometimes brazed in an inert atmosphere, or in the absence of atmosphere. It might appear offhand that it should be possible to clean the aluminum surface immediately before removal of thte surrounding atmosphere and thus present a clean face to the molten solder; but the immediate formation of fresh invisible oxide film in air renders this impossible. The conceivable alternative of cleaning the surface in the absence of air, while technically possible, would require extremely elaborate equipment, and much labor. However, it has been found possible to braze together in vacuo pieces of aluminum of purity in excess of 99 percent (commercial designation No. 1100) by placing between the parts to be joined a brazing sheet (commercial designation No. 23), which consists of a central part or base sheet of alloy of composition 0.25 percent copper, 0.35 percent silicon, 0.6 percent magnesium, 0.2 percent maximum zinc, remainder aluminum plus casual impurities (commercial designation No. 6951), and faces or "cladding" of alloy containing 10 percent silicon and the remainder aluminum plus casual impurities (commercial designation No. 4045). An alloy such as the "cladding" here described, which is used in the conventional prior art with fluxes to join, by its fusion, parts of aluminum or of high aluminum content may be described as an aluminum brazing material, thus distinguishing it from the hard solders and particularly the brasses employed for brazing other materials even prior to the availability of aluminum and its alloys. The pure aluminum parts, with the brazing sheet between them, are placed in a furnace which is then evacuated, and is raised to the brazing temperature, and then allowed to cool. Upon readmission of air to the furnace, the parts are found soundly brazed together, with fillets of metal at the joints indicative of good wetting of the parts by molten metal. In operation in this manner, the use of an added flux is not required.

It has been found that, in a particular application in which excellent heat transfer across the brazed joint is required, the heat conductivity of the type 6951 base sheet of the No. 23 brazing sheet is significantly poorer than that of the type 1100, or commercially pure, aluminum. In order to eliminate the thermal resistance of the type 6951 alloy, an attempt was made to braze together parts of type 1100 alloy using a brazing sheet having a base sheet of type 1100 alloy with faces or "cladding" of type 4045 alloy. The type 1100 alloy parts, with the new brazing sheet between them, were placed in a furnace, which was evacuated and then heated to brazing temperature. All conditions were identical with those employed in the successful operation hereinbefore described, except that the base sheet of the brazing sheet was of nominally pure aluminum, instead of the type 6951 alloy. Upon cooling the furnace, admitting air, and removing the pieces, they were found not to be brazed. This failure suggested to me that it was the presence in the type 6951 alloy of metals which readily alloy with aluminum and which have an appreciable vapor pressure at brazing temperatures which was responsible for the difference in success between the two operations. The elements present in the successful operation and not in the unsuccessful experiment were magnesium, zinc, and copper. However, the boiling point of copper is 2310 degree C., that of magnesium is 1110 degrees C., and that of zinc 907 degrees C., and the melting point of aluminum is 658.7 degrees C., so that at the usual brazing temperature the vapor pressures of zinc and magnesium are considerably higher than that of copper; they are very volatile. Furthermore, certain deposits appeared in the vacuum furnace in the vicinity of material brazed with No. 23 brazing sheet, but did not appear in the furnace in the vicinity of material brazed with the brazing sheet having a type 1100 base sheet. Analysis showed these deposits to be magnesium. I therefore directed the repetition of the operation of brazing together parts of type 1100 material, as hereinbefore described as an unsuccessful experiment, but with the addition, in the vicinity of the joints to be brazed, of particles of material having a content of magnesium. This novel operation produced sound, well-filleted brazed joints. No conventional flux was used in this operation.

I have no sure explanation of the reason why this procedure is effective. However, I believe that the vapors of magnesium wet the aluminum surface and effectively "tin" it in a manner analogous to the tinning of articles by soft solder, alloying with the aluminum in the process. This suggestion alone does not explain how these vapors penetrate the oxide coating on the joint face to wet the metal beneath. I hypothesize that either the vapors penetrate the oxide because it is permeable to them, or that the oxide layer cracks during heating, because its thermal expansion coefficient differs from that of the metal beneath it. In either case, I believe that the vapors of the volatile metal wet the metallic surface of the joint face, and that the resulting surface tension is sufficient to free the oxide coating from the metal on which it was originally formed. These hypotheses would account for the observed effects; but it must be repeated that they are only hypotheses.

On the basis of the explanation given, it appears that this basic method may be applied to the brazing of other materials which usually require fluxes. It is evident that the requirement for the metals which, like magnesium, eliminate the need for flux, is that they have a significantly high vapor pressure at the temperature of brazing, and that they wet the surface of the joint face sufficiently well to penetrate beneath the oxide coating thereon. It is evident also that the vaporization of the metals will permit them to penetrate, as vapors, porosities or cracks in an oxide coating so small that the surface tension would not allow a molten metal to enter them. Vaporization also has the advantage that the metal which vaporizes may itself have a surface coating of oxide, and yet vaporize through its own oxide coating to penetrate, as a vapor of pure unoxidized metal, other oxide coatings on the joint faces. It is, of course, essential that the vaporizing metal shall be capable of entering into a good brazed joint between the joint faces and the brazing material; if the vaporizing metal formed a layer on the joint faces which could not be wet by the brazing metal, it is highly unlikely that a good brazed joint would be produced. It is also possible that the reduction of melting point produced by alloying of the joint face with the vapor facilitates joining.

A reference on conventional aluminum brazing is "Welding and Brazing Alcoa Aluminum," Aluminum Company of America, Alcoa Building, Pittsburgh 19, Pa.

What is claimed is:

1. In the operation of brazing together pieces of metal of high aluminum content in vacuo, in the absence of flux, with an aluminum brazing material, the improvement which comprises exposing the surfaces to be joined to the action of magnesium vapor during the brazing operation.

2. In the operation of brazing together pieces of metal of high aluminum content in vacuo, in the absence of flux, with an aluminum brazing material, the improvement which comprises placing particles of metal containing magnesium in the vicinity of the surfaces to be joined and leaving them there during the brazing operation.

References Cited

UNITED STATES PATENTS

| | | | |
|---|---|---|---|
| 2,123,384 | 6/1938 | Silliman | 29—504 X |
| 2,258,681 | 10/1941 | Hoglund | 29—495 |
| 2,943,181 | 1/1960 | Gunow et al. | 29—504 X |

JOHN F. CAMPBELL, *Primary Examiner.*